United States Patent Office 3,413,118
Patented Nov. 26, 1968

3,413,118
LIVESTOCK FEED AND THE METHOD
OF MAKING SAME
Boris Kviesitis, Des Moines, Iowa, assignor to Vylactos
Laboratories, Inc., Des Moines, Iowa
No Drawing. Filed Aug. 21, 1964, Ser. No. 391,282
13 Claims. (Cl. 99—6)

ABSTRACT OF THE DISCLOSURE

A livestock feed including a non-protein nitrogenous compound selected from the group consisting of urea and ammonium salts added thereto. The non-protein nitrogenous compound is coated with an emulsion comprised of proplylene glycol, vegetable oil, vegetable wax and lecithin and a quantity of a palatability increasing agent is then added to the coated non-protein nitrogenous compound so that the same is absorbed thereby.

---

It has been recognized that non-protein nitrogenous compounds may be substituted for some of the protein in rations for ruminants. Some of the non-protein nitrogenous compounds which have been found to have high protein replacement values are urea and various ammonium salts. The addition of urea and various ammonium salts to livestock feed has been practiced for some time. Urea and the various ammonium salts are very economical and cost less than bona fide protein feed. The urea or ammonium salts when introduced to the stomach of an animal stimulates the micro-organism present therein. These micro-organisms in the stomach of the animal utilize the urea or ammonium salts to create protein. The extent to which these sources of nitrogen can be substituted for protein nitrogen in livestock feed depends upon certain nutritional conditions, toxicity levels and economic factors.

An important problem in the use of non-protein nitrogenous compounds concerns the palatability of the feed mixture with added urea or ammonium salts. The animals simply do not like the taste of urea or ammonium salts and will reduce their consumption thereof. It has been recognized that urea feed can be made more palatable by the addition of cane molasses thereto. The most common method is to add liquid cane molasses to the urea or ammonium salts at a ratio of approximately 10 percent by weight of the total ration. Livestock feeds containing a high level of urea or ammonium salts have a tendency to become sticky and to cake into large aggregates. This caking is caused by the melting of the urea or ammonium salts in the moisture of the feed ingredients used to produce livestock feed.

Another method of increasing the palatability of the feed containing the urea or ammonium salts is to add cane molasses in dried form thereto. This method only partially improves the palatability of the feed because there is inadequate contact between the granules of dried molasses and the granules of urea or ammonium salts. The animals are still able to detect the taste of the urea or ammonium salts and will refuse to eat the feed.

As stated before, the addition of urea or ammonium salts to a livestock feed presents a serious toxicity problem. It has been found that feeding high levels of urea or ammonium salts to livestock for extended periods of time causes diuresis and hypertrophied and damaged kidneys. However, acute toxicity of urea or ammonium salts is attributed to its high solubility and subsequent rapid release of ammonia when it is consumed with feed by the animals. Neither of the before mentioned methods of adding molasses to the urea or ammonium salts reduces the solubility of the granules thereof.

Therefore, it is a principal object of this invention to describe a method of making a livestock feed containing non-protein nitrogenous compounds such as urea or ammonium salts which is highly palatable.

A further object of this invention is to describe a method of making a livestock feed containing non-protein nitrogenous compounds such as urea or ammonium salts which prevents injury to the livestock consuming the feed.

A further object of this invention is to describe a method of making a livestock feed containing non-protein nitrogenous compounds such as urea or ammonium salts which prevents high levels of toxicity from occuring in the stomachs of the livestock consuming the feed.

A further object of this invention is to describe a method of making a livestock feed containing non-protein nitrogenous compounds such as urea or ammonium salts in which the solubility thereof is controlled.

A further object of this invention is to describe a method of making a livestock feed containing non-protein nitrogenous compounds such as urea or ammonium salts which permits substitution of urea or ammonium salts in large amounts for the protein ordinarily used in the livestock feeds.

A further object of this invention is to describe a method of making a livestock feed containing non-protein nitrogenous compounds such as urea or ammonium salts which may be fed to the livestock in an economical manner.

A further object of this invention is to describe a method of making a livestock feed containing non-protein nitrogenous compounds such as urea or ammonium salts which have a highly palatable and slowly soluble film on the surface of the granules of the urea or ammonium salts.

A further object of this invention is to describe a method of making a livestock feed containing non-protein nitrogenous compounds such as urea or ammonium salts which will not readily cake.

A further object of this invention is to provide a coating for urea or ammonium salts that is palatable and slowly soluble.

A further object of this invention is to describe a method of making a livestock feed containing non-protein nitrogenous compounds such as urea or ammonium salts which insures accepted nutritional conditions to be present.

A further object of this invention is to describe a method of making a livestock feed containing non-protein nitrogenous compounds such as urea or ammonium salts in which the urea or ammonium salts have a highly pliable film thereon which will not readily dislodge therefrom.

A further object of this invetinon is to describe a method of making a livestock feed containing non-protein nitrogenous compounds such as urea or ammonium salts which is economical of manufacture.

Livestock feeds containing a high level of urea compound have a tendency to become sticky and cake into large aggregates. This caking is caused by the melting of urea in the moisture of the feed ingredients used to produce livestock feed. Urea compound sold to the feed manufacturer contains a negligible, amount of moisture. The moisture content of many other common feed ingredients is comparatively higher. For example, the average moisture content is:

| | Percent |
|---|---|
| Dehydrated alfalfa meal | 8.0 |
| Wheat middlings | 10.0 |
| Soybean meal | 9.0 |
| Corn meal | 10.0–15.0 |

Urea is a highly hygroscopic compound and it will melt in the moisture it absorbs. As 17° C. one part of urea will dissolve in one part of water. At an elevated temperature the solubility of urea in water is much higher. The solution of urea will cement the particles of the feed creating a caking problem. To prevent the caking of feed containing high level of urea it is necessary to use ingredients of low moisture content. One such ingredient is cane molasses dried on alfalfa meal containing approximately 1.0% moisture as utilized in Example No. 5. In the manufacturing of dried molasses products the low moisture content is a prerequisite for obtaining a product of quality.

The desired end result is to completely cover the granules of urea or ammonium salts with a film which has a palatability improving agent thereon such as cane molasses, beet molasses, corn molasses, citrus molasses or sugar syrup and which also control the solubility of the granule. It is also desired that the final product be non-caking in storage and will not be sticky. It is also desired that a highly pliable film be deposited on the granules of the urea or ammonium salt which will not become dislodged therefrom. All of the desired results were obtained in each of the following examples.

EXAMPLE NO. 1

One part of propylene glycol, one part of vegetable oil, one part of vegetable wax and one part of lecithin were mixed in a conventional blender to form an emulsion Approximately 800 lbs. of urea or ammonium salts were placed in a batch-type mixer and 20 lbs. of the above described emulsion was added thereto. This mixer was agitated for approximately five minutes until the granules of urea or ammonium salts were covered with the emulsion. Approximately 180 lbs. of powdered dry cane molasses was then added to the mixer and the mixing was continued for another five minutes. At the end of this mixing the molasses powder was absorbed by the emulsion and a pliable film was formed on the surface of the granules of urea or ammonium salts. A non-caking agent such as tricalcium phosphate, kaolin, calcium stearate, starch, etc., can be added to the mixture if so desired to prevent it from caking in storage. The final product is in a granulated, free-flowing form.

EXAMPLE NO. 2

An emulsion of propylene glycol, vegetable oil, vegetable wax and lecithin was prepared according to the method described in the first example. The urea or ammonium salts were introduced into a conventional mixer from a storage bin by means of a conveyor and gravimetric feeder. The emulsion was sprayed on the surface of the particles of urea or ammonium salts in the mixer. The emulsion was sprayed on the urea or ammonium salts at a ratio of 1 to 4 parts emulsion to 100 parts urea or ammonium salts. The urea or ammonium salts in the mixer were subjected to continuous agitation and gradually became coated with emulsion. When the urea or ammonium salts granules were substantially covered with the emulsion, a measured amount of the powdered dry cane molasses was introduced to the mixer by means of a gravimetric feeder at the rate of approximately two parts to 8 parts of urea or ammonium salts. The cane molasses powder was gradually absorbed on the surface of the particles of urea or ammonium salts as the mixer was being agitated. At this point some of the before mentioned non-caking compounds may be introduced by means of gravimetric feeder at a rate of 0.5 to 2.0 percent by weight. The final product is in a granulated, free flowing form.

EXAMPLE NO. 3

An emulsion comprised of one part of propylene glycol, one part of vegetable oil, one part of vegetable wax and one part of lecithin was placed in a supply tank and heated to approximately 160 to 180 degrees Fahrenheit by means of steam coils. The urea or ammonium salts were introduced to the continuous mixer by means of a gravimetric feeder. The mixer was equipped with a jacketed trough which is connected by means of a pipeline to a supply of steam. This supply of steam was necessary to maintain the temperature within the mixer at approximately 160 to 180 degrees Fahrenheit. The hot emulsion from the supply tank was sprayed on the surface of the particles of the urea or ammonium salts in the mixer by means of spray nozzles, a pipeline and a volumetric pump. This emulsion was sprayed on the urea or ammonium salts at a ratio of approximately 1 to 4 parts emulsion to 100 parts of the urea or ammonium salts. As the urea ammonium salts in the mixer were subjected to continuous agitation, heating and being conveyed forward the particles became coated with the emulsion. When the particles of the urea or ammonium salts were substantially coated with the emulsion, a quantity of powdered dried cane molasses was introduced from a supply bin to the mixer by means of a gravimetric feeder at the rate of approximately 2 parts molasses to 8 parts urea or ammonium salts. The dried powder of cane molasses became absorbed on the surface of the particles of urea or ammonium salts. The molasses-emulsion film under the effects of heat became very soft and formed a dense coating on the surface of the granules of urea or ammonium salts. A non-caking compound was then introduced to the mixer at the end of the mixing process and all of the material was discharged therefrom by means of a conventional belt or screw-type cooler where the produce was cooled to the temperature of 60 to 80 degrees Fahrenheit. From the cooling unit, the product was conveyed to a storage bin and then prepared for distribution. The final product was in a granulated, free-flowing form.

EXAMPLE NO. 4

An emulsion of propylene glycol, vegetable oil, vegetable wax and lecithin was prepared according to the method described in Example No. 1. Approximately 400 lbs. of urea or ammonium salts were placed in a batch-type mixer and 10 lbs. of the emulsion were added thereto. This mixer was agitated for approximately five minutes until all of the granules of urea or ammonium salts were covered with the emulsion. Approximately 300 lbs. of powdered dried cane molasses was then added to the mixer and agitated for approximately five more minutes. Approximately 280 lbs. of dried powdered corncobs were placed in a second batch-type mixer and treated with approximately 10 lbs. of the above described emulsion by spraying it thereon through spray nozzles. The corncobs with the emulsion thereon was then added to the urea, emulsion and dried molasses mixture in the first mixer and all of the ingredients were agitated for approximately five minutes. The corncob powder treated in this way became a part of the homogeneous mixture. The corncob powder in this example was used as an extender and as a moisture absorbing agent. The final product was in meal form and free-flowing.

EXAMPLE NO. 5

An emulsion of propylene glycol, vegetable oil, vegetable wax and lecithin was prepared according to the method described in the first example. Approximately 200 lbs. of urea or ammonium salts were placed in a batch-type mixer and 20 lbs. of the emulsion were added thereto. This mixture was agitated for approximately five minutes until the granules of urea or ammonium salts were covered with a film of the emulsion. Approximately 760 lbs. of alfalfa having powdered cane molasses dried thereon was then added to the mixture and agitated for approximately five minutes. The resulting product can be used in meal form to blend it with other ingredients or it can be pelleted and used in pellet form. The presence of the emulson in this formulation make it possible to form pellets in conventional feed pellet mills without the addition of steam, water, or liquid molasses. The pellets made in this manner are of low moisture content and if properly packaged in moisture-proof bags will prevent the urea or ammonium salts from dissolving and subsequent caking. The alfalfa with the dried cane molasses dried thereon was prepared by mixing approximately 400 lbs. of feed grade cane molasses and approximately 490 lbs. of dehydrated alfalfa. This mixture was dried to the moisture level of approximately 1.0% by means of conventional drying processes employing a rotary drier. The low moisture content of the alfalfa with the cane molasses dried thereon prevents caking. The cane molasses concentration in this type of produce could be increased up to 1000 lbs. of feed grade molasses to 490 lbs. of alfalfa.

While many more examples could be cited with a variety of feeds, it should be noted that the emulsion of propylene glycol, vegetable oil, vegetable wax and lecithin is common to all of the examples. Dried cane molasses is slightly soluble in propylene glycol, but is miscible therewith at any proportion without forming lumps or cakes. The propylene glycol acts as a carrying agent for the molasses without totally dissolving the same.

A propylene glycol-molasses film on urea or ammonium salts is highly palatable and prevents the animals from detecting the taste of urea or ammonium salts. This propylene glycol-molasses film is highly soluble in water which would mean that the film would rapidly dissolve in the stomach of the animal and thereby expose the animal to the dangers of a rapid release of ammonia therefrom. To combat this high solubility, vegetable wax and vegetable oil with lecithin is added to the propylene glycol.

While the foregoing examples describe the most desirable proportions and ingredients whereby the most desirable results are obtained, it is possible to vary these proportions and ingredients somewhat. The lecithin can be substituted with an edible type of commercial surface agent such as monoglyceride and diglyceride of the fatty acids, sorbitan monostearate and similar materials. The propylene glycol could be substituted with a dipropylene glycol or glycerine, neither of which is as satisfactory as the propylene glycol. Animal fat could be substituted for the vegetable oil.

The vegetable wax, vegetable oil and lecithin additives insure that the palatable film is slowly soluble in the stomach of the animal and will thereby reduce rapid release of ammonia from the urea or ammonium salts. This means that a higher percentage of urea or ammonium salts may be added to the livestock feed without fear of injuring the animal. As stated before, urea or ammonium salts are more economical than the ordinary protein feeds so that this results in a lower cost feed.

The addition of the non-caking agents as previously described insures that the feed will not cake in storage. Such non-caking of the feed permits easy handling and feeding thereof.

While the invention describes the coating of urea or ammonium salts with a palatable film, it is conceivable that processes similar to those herein described could be used during the manufacture of the urea or ammonium salts so that the finished product thereof incorporated a coating thereon or was impregnated with a similar emulsion as herein described.

Some changes may be made in the construction and arrangement of my livestock feed and the method of making same without departing from the real spirit and purpose of my invention, and it is my intention to cover by my claims, any modified forms of structure or use of mechanical equivalents which may be reasonably included within their scope.

I claim:
1. A method for making a livestock feed, comprising the following steps,
adding 1 to 4 parts by weight of a coating emulsion to 11 to 100 parts by weight of a non-protein nitrogenous compound selected from the group consisting of urea and ammonium salts which is insoluble in said coating emulsion,
mixing said coating emulsion and said non-protein nitrogenous compound until said non-protein nitrogenous compound is coated with said coating emulsion,
adding a quantity of a palatability increasing agent to the coated non-protein nitrogenous compound,
and mixing said palatability increasing agent and said coated non-protein nitrogenous compound until said palatability increasing agent is absorbed thereby,
said coating emulsion being comprised of a quantity of propylene glycol, a quantity of vegetable oil, a quantity of vegetable wax and a quantity of lecithin.

2. The method of claim 1 wherein said palatability increasing agent is comprised of a sweetener-type palatability increasing agent.

3. The method of claim 1 wherein said coating emulsion and said non-protein nitrogenous compound are separately pre-heated to approximately 160–180 degrees Fahrenheit.

4. The method of claim 1 wherein said coating emulsion is added to said non-protein nitrogenous compound at a ratio of one part by weight to 40 parts by weight of said non-protein nitrogenous compound.

5. The method of claim 1 wherein alfalfa having dried powdered cane molasses dried thereon is mixed with the coated non-protein nitrogenous compound.

6. The method of claim 5 wherein said alfalfa with the cane molasses dried thereon is dried until a moisture content of approximately 1.0% is obtained before it is mixed with the coated non-protein nitrogenous compound.

7. The method of claim 1 wherein a quantity of dried powdered corn cobs is coated with a quantity of said coating emulsion and then added to the coated non-protein nitrogenous compound and said palatability increasing agent.

8. The method of claim 7 wherein approximately 10 pounds of said coating emulsion is added to approximately 400 pounds of said non-protein nitrogenous compound and approximately 300 pounds of said palatability increasing agent is added thereto and approximately 280 pounds of dried powdered corn cobs having approximately 10 pounds of coating emulsion thereon is added thereto.

9. A method for making a livestock feed, comprising the following steps,
adding 1 to 4 parts by weight of a coating emulsion to 11 to 100 parts by weight of a non-protein nitrogenous compound selected from the group consisting of urea and ammonium salts which is insoluble in said coating emulsion,
mixing said coating emulsion and said non-protein nitrogenous compound until said non-protein nitrogenous compound is coated with said coating emulsion,
adding a quantity of a palatability increasing agent to the coated non-protein nitrogenous compound,
and mixing said palatability increasing agent and said coated non-protein nitrogenous compound until said palatability increasing agent is absorbed thereby,
said coating emulsion being comprised of equal parts by weight of propylene glycol, vegetable oil, vegetable wax and lecithin.

10. The method of claim 9 wherein said coating emulsion is sprayed on said non-protein nitrogenous compound at a ratio of 1–4 parts by weight to 100 parts by weight of said non-protein nitrogenous compound.

11. The method of claim 10 wherein said palatability increasing agent is added to the coated non-protein nitrogenous compound at a ratio of one part by weight to four parts by weight of said non-protein nitrogenous compound.

12. A livestock feed having incorporated therein,
a quantity of particles of a non-protein nitrogenous compound each having a coating thereon; said particles being substantially insoluble in said coating; and a palatability improving agent impregnated in said coating, said non-protein nitrogenous compound selected from the group consisting of urea and ammonium salts, said coating being comprised of an emulsion of propylene glycol, vegetable oil, vegetable wax and lecithin.

13. The livestock feed of claim 12 wherein the palatability improving agent is comprised of a sweetener-type palatability improving agent.

References Cited

UNITED STATES PATENTS 2,560,830  7/1951  Turner ---------------- 99—2
3,192,030  6/1965  Mills ---------------- 71—64
3,249,441  5/1966  Reynolds -------------- 99—2

RAYMOND N. JONES, *Primary Examiner.*

J. M. HUNTER, *Assistant Examiner.*